(12) United States Patent
Hughey

(10) Patent No.: US 6,223,760 B1
(45) Date of Patent: May 1, 2001

(54) LOCKED CAR COVER

(76) Inventor: Mark Hughey, 222 North Ave., Aptos, CA (US) 95003

( * ) Notice: Subject to any disclaimer, the term of this patent is extended or adjusted under 35 U.S.C. 154(b) by 0 days.

(21) Appl. No.: 09/407,528

(22) Filed: Sep. 28, 1999

(51) Int. Cl.[7] .................................................. B60J 11/00
(52) U.S. Cl. ..................................... 135/88.05; 135/88.01
(58) Field of Search .................... 135/88.01, 88.05; 296/136, 163

(56) References Cited

U.S. PATENT DOCUMENTS

| | | | | |
|---|---|---|---|---|
| 2,315,680 | * | 4/1943 | Ward | 135/88.05 |
| 4,799,728 | * | 1/1989 | Akers et al. | 296/136 |
| 4,825,889 | | 5/1989 | Monteith | 135/88 |
| 4,842,324 | * | 6/1989 | Carden | 296/136 |
| 4,998,768 | | 3/1991 | Wu | 296/136 |
| 5,244,245 | * | 9/1993 | Kashino | 296/136 |
| 5,244,246 | * | 9/1993 | Cunningham | 296/136 |
| 5,476,127 | * | 12/1995 | Fournier | 296/136 X |
| 5,522,409 | | 6/1996 | May | 135/88.05 |
| 5,791,361 | | 8/1998 | Chong | 135/88.05 |

* cited by examiner

*Primary Examiner*—Peter R. Brown
(74) *Attorney, Agent, or Firm*—Robert S. Smith

(57) ABSTRACT

A cover for shielding an automobile from radiation from the sun comprising a sheet with a flap having one edge secured to the sheet at a location that permits positioning the cover over the roof of the car with the flap extending through a side window into the interor of the car and with the flap against the outside surface of the car. When the car window is rolled up, the edge of the window clamps the cover to the window frame of the car thereby preventing removal of the cover by a thief.

19 Claims, 2 Drawing Sheets

LOCKED CAR COVER

FIELD OF THE INVENTION

This invention relates to covers for automobiles and particularly to a cover that is lockable to the car by capturing an attachment to the cover that is secured to the car by rolling the window up against the attachment.

PRIOR ART AND INFORMATION DISCLOSURE

A car sitting out in the hot sun is a major frequent irritation to many car owners who are forced to park their car in the hot sun such as in their driveway, at work, or shopping. The functions like an over raising the temperature of the car to well above 100° F. necessitating that the driver open all windows and suffering through a few moments while the interior of the car cools off. The situation is also often a major expense in that, over time, the hot sun deteriorates the upholstery and plastic parts such as the dashboard to crack severely thereby diminishing the value of the automobile.

Covers have been available on the market for many years that may be draped over the car to shield the car from the damaging effects of the sun. These covers typically cover the entire automobile in order to protect not only the interior of the ar but also to protect the exterior painted surface. However, by far, the greatest sun damage to the car results from radiation primarily through the windows and secondarily on the car roof.

Numerous covers and shields have been disclosed for shielding the car from the sun's rays.

For example, a cardboard shield has been available for several years that is placed across the front window to protect the dashboard.

U.S. Pat. No. 5,791,361 to Chong discloses a car cover for placement over a roof, front and rear windows with zippers to bring various portions s of the cover into conformance with the shape of car. The car also features cut portions of the window portions that may be removed or laid back to admit ventilation into the car interior when desired. The cover is attached to the car by strings that extend to suction cups that may be positioned on the interior or exterior of the car windows. This invention has a number of disadvantages in terms of the expense, ease of applying the cover, etc. which will become evident in the following description of the invention.

U.S. Pat. No. 5,522,409 discloses a canopy style cover for a vehicle that is not practical for temporary use such as when shopping or parking for work.

U.S. Pat. No. 4,998,768 discloses a sunshade with a frame for mounting on the vehicle.

U.S. Pat. No. 4,825,889 discloses a sun shade for a vehicle formed from a rectangular sheet with flexible tie straps. None of the cited art is characterized by the convenience which is inherent in the present invention.

SUMMARY OF THE INVENTION

It is an object of this invention to provide a cover for an automobile that is conveniently anchored to the inside of the automobile by the driver before the drive emerges from the vehicle and which he then spreads over the roof of the car from the outside.

It is a further object of the invention to prevent thievery of the cover or dislodging of the cover by weather conditions or otherwise loss of the cover during the owners absence.

It is still another object of the invention that use of the cover be simple and low cost compared to covers of the present state of the art.

This invention is directed toward a sheet that extends over at least the roof and window ares of the vehicle. In the context of this specification, terms, sheet and cover<are used interchangably. The sheet is foldable into a neat package with an anchoring flap secured to the cover and accessible when the cover is folded. The sheet is preferably a light reflecting material such as a nylon cloth and the flap is preferably a semi-rigid panel of an appropriate plastic such as polycarbonate.

In another embodiment, small weights stitched into the edges of the cover distal from the panel maintain the cover in position over the roof of the vehicle.

DESCRIPTION OF A BEST MODE

Turning now to a description of the drawings, FIG. 1 shows an embodiment of the invention being a sheet of flexible material covering a roof and windows of a car.

Figure 1A:
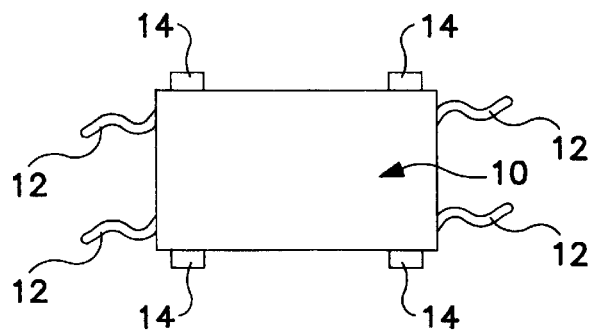
FIG. 1 shows one embodiment of the cover of this invention.
Figure 1B:
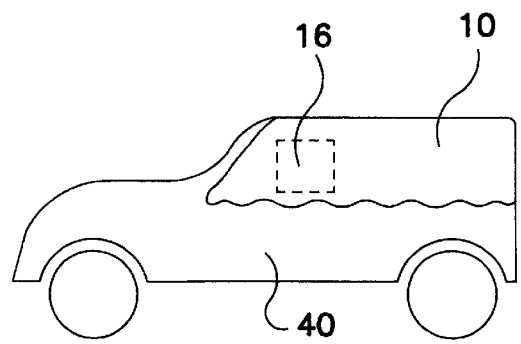

FIG. 1A shows the sheet comprising a single rectangle with straps 12 and buckles for containing tucked portions of the sheet at the corners. This embodiment is useful where it may be desired to use the sheet at various times on several automobiles each having a different size. FIG. 1A also shows a flap 16 secured along one edge 19 to the sheet 10 at a location that permits positioning the sheet over the car with the flap 16 inserted through the front window into the vehicle withe window rolled up and clamping onto the cover inside the vehicle. FIG. 1B shows the cover 10 draped over the car with the flap 16 (in phantom) clamped by the window.

Figure 2:
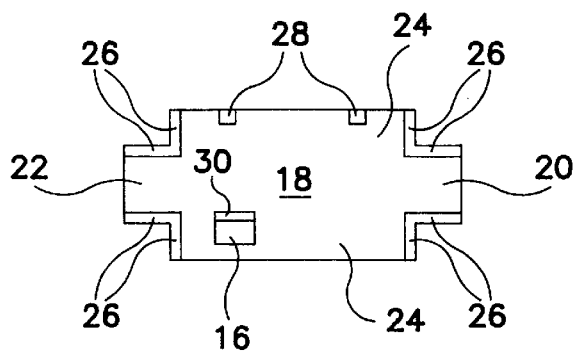
FIG. 2 shows the cover with cutout corners.

FIG. 2 shows another embodiment in which corners are removed thereby defining a roof portion 18, a rear window portion 20, front portions 22, and side portions 24 of the cover. This arrangement allows for neat conformance of the cover to the shape of the vehicle. Velcro™ strips 26 along neighboring edges of the window portions of the cover help to secure the cover to the vehicle.

Small padded weights 28 also help to maintain the sheet in position on top of the car.

An important feature is the flap 16 (preferably semi rigid) having one edge 17 stitched on a front window portion 24 of the sheet 10.

Figure 3:
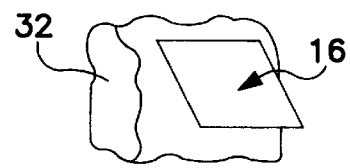
FIG. 3 show the cover in a bag with the flap accessible.

In one embodiment, as shown in FIG. 3, the sheet 10 is foldable into a neat package and can be stuffed into a bag 32 such that the flap is on the outside of the package.

The bag may have a rectangular shape.

Figure 4:
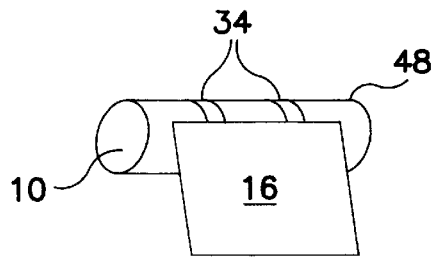
FIG. 4 shows the cover folded into a roll.

FIG. 4 shows another embodiment, the sheet has Velcro™ straps 34 attached that are folded around the folded cover when the sheet is rolled up like a sleeping bag and hold the folded cover together for convenient storage.

In order to install the cover, the user (driver) opens the window partially and hangs the package outside the vehicle with the flap hanging against the inside surface of the window.

Then he rolls the window up thereby clamping the plastic panel and cover to the window frame of the vehicle. He then opens the door, gets out of the car and closes the door, locking it from the outside or from the inside before he left the car. Then he unfolds the cover, still attached by the panel to the window, and drapes (throws) the cover over the roof and window of the car. The doors are locked so that, with the other windows closed and the one window clamping tightly against the panel, a would-be thief is thwarted from stealing the cover from the car.

Figure 5A:
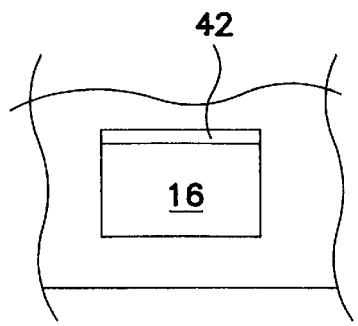
FIGS. 5A and 5B show the flap attached to the cover by a pliant strip or channel respectively.

FIG. 5A shows another embodiment in which the joining edge of the flap 16 is joined to one edge of a pliant strip 42 (e.g., cloth) and the opposite edge is stitched in place to the cover so that the window actually clamps onto the strip.

Figure 5B:
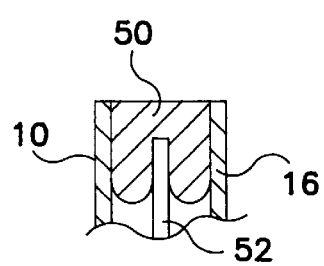

In another embodiment, FIG. 5B is a sectional view of a semi rigid channel 50 straddling the window 52 having an edge of the panel 16 joined to one leg and the cover 10 joined to the other leg of the channel. These features enable the window to clamp more tightly.

The flap 16 is preferably a semi-rigid panel such as polycarbonate sheet. However, other materials of the panel may be used which are within the scope of the invention such as any one of a number of rigid plastics (e.g., polystyrene or even wood or metal for very rugged situations.) Alternatively, a flexible cloth panel may be used for those who are fearful of scratching the vehicle.

The sheet of the cover is preferably a light weight nylon however, other materials would also be satisfactory such as waterproof cloth of cotton, rayon, polyester or wool.

The cover preferably has an attractive bright light-reflecting colored surface such as silver or gold that is effective not only for protection against the sun but also is a beacon to the driver who has parked his car in a large car filled parking lot, goes into his place of business and, upon emerging cannot immediately locate his car.

The cover of this invention is provides valuable advertising space.

Variations and modifications of the invention may be contemplated after reading the specification and studying the drawing which are within the scope of the invention.

For example, while major protection is provided by a cover that extends from the roof down to only the window sills of the vehicle, further protection is provided by a cover whose side portions cover the entire area of the car.

Figure 6A:
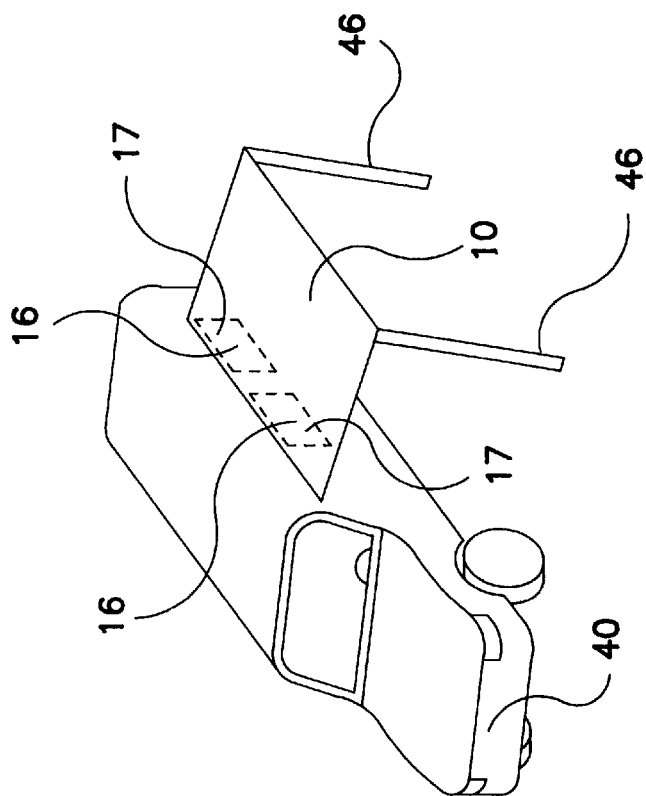
FIGS. 6A and 6B show the cover used as a canopy.
Figure 6B:
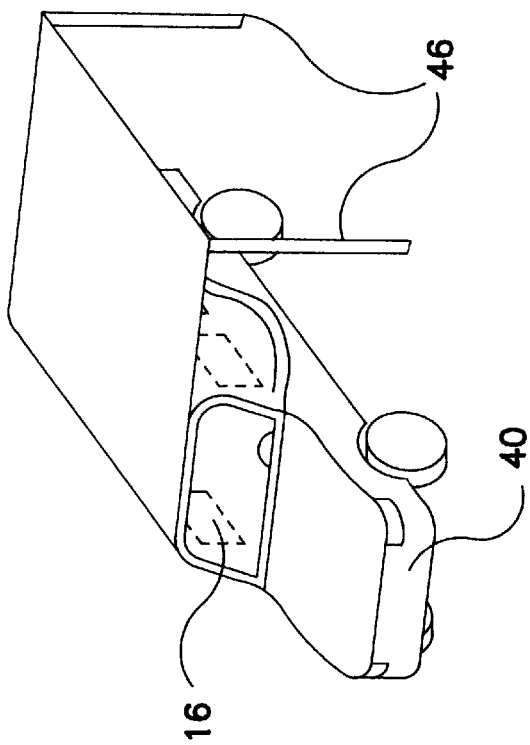

The cover may have two adjacent flaps, one flap anchored by the side rear window and another flap anchored by the front rear window. The cover is then stretched out either or across the top of the car 44 (FIG. 6A) or away from the car (FIG. 6B) and the free corners of the cover are supported on stakes 46 so that the cover is a canopy providing a shady spot for lounging or protection from unexpected rain during a tailgate party.

I therefore wish to define the scope of my invention by the appended claims.

I claim:

1. A cover which is attachable to a vehicle having a roof, sides and at least one window that can be rolled closed on a side of said vehicle, said cover comprising:

a flexible sheet (10), dimensioned to cover said roof and a portion of sides of said vehicle;

a substantially rectangular rigid flap (16) having an edge (17) secured to an area of said sheet at a location selected to permit said sheet to be positioned over said roof and said flap positioned inside said car with an edge of said window clamped against said flap providing that after said flap is positioned against an inside surface of said window and a user sitting inside said vehicle traps said flap between a window edge and a window frame by closing said window toward said frame, said user is enabled to get out of said vehicle through a door opposite said window and lock said door whereby said cover and vehicle are secured against theft.

2. The cover of claim 1 further comprising:

said sheet being generally rectangular with four corners;

a hook and loop fastening means in each corner of said sheet (10) positioned to aid in retention of said sheet in position on said roof of said vehicle.

3. The cover of claim 1 wherein said sheet comprises:

a roof portion (18):

a side window portion (24) having an edge attached along an edge of said roof portion opposite another side window portion attached along an opposite edge of said roof portion;

a front window portion (22) having an edge attached along an edge of said roof portion opposite a rear window portion (20) attached along an opposite edge of said roof portion.

4. The cover of claim 3 wherein said edge of said flap is positioned to hang against an inside surface of said front side window when said front side window portion hangs against an outside surface of said front side window.

5. The cover of claim 3 wherein said edge of said flap is positioned to hang against an inside surface of said rear side window when said rear side window portion hangs against an outside surface of said rear side window.

6. The cover of claim 5 wherein said at least one window is a front side window adjacent a rear side window and said cover comprises said flap having an edge secured to an area of said sheet at a location selected to permit said sheet to be positioned over said roof and said front side flap positioned inside said car with an edge of said front side window clamped against said front side flap and a rear side flap positioned inside said car with an edge of said rear side window clamped against said rear side flap.

7. The cover of claim 6 comprising a hook and loop fastening means operably arranged to detachably join an edge of said side window portion to an adjacent edge of said rear window portion of said cover.

8. The cover of claim 6 comprising hook and loop fastening means operably arranged to detachably join an edge of said side window portion of said cover to an adjacent edge of said front window portion of said cover.

9. The cover of claim 5 further comprising a pair of rods (46) dimensioned to permit extending said cover away from said vehicle with said front side flap and said rear side flap clamped respectively in said front side window and said rear side window with each free corner of said cover supported on an end of one stake respectively, when each said stake is oriented vertically with a lower end supported by the ground.

10. The cover of claim 1 wherein said sheet is nylon.

11. The cover of claim 1 wherein cover is selected to reflect radiation from the sun.

12. The cover of claim 1 where said cover has a silvered reflective surface.

13. The cover of claim 1 where said cover has a gold reflective finish.

14. The cover of claim 1 wherein said sheet comprises a material selected from a group of materials that consists of cotton, polyester and wool.

15. The cover of claim 1 wherein said flap comprises polycarbonate.

16. The cover of claim 1 wherein said flap is cloth.

17. The cover of claim 1 wherein said flap and sheet are secured together by a strip of flexible material having one edge secured to said edge of said flap and an opposite edge of said strip secured to said cover at said location selected to permit said sheet to be positioned over said roof and said flap positioned inside said car with an edge of said window clamped against said flap.

18. The cover of claim 1 further comprising a bag for storing said cover arranged to permit said flap to be located outside said bag.

19. The cover of claim 1 further comprising a strap arranged to permit rolling said cover into a roll with said flap attached to said cover and hanging outside said roll, said flap being accessible for positioning said cover with said window clamping said flap before unrolling said cover.

* * * * *